US010574300B2

(12) United States Patent
Jung et al.

(10) Patent No.: US 10,574,300 B2
(45) Date of Patent: *Feb. 25, 2020

(54) APPARATUS FOR HANDLING CHANGE IN ORIENTATION OF TERMINAL DURING WIRELESS POWER TRANSFER AND METHOD THEREOF

(71) Applicant: LG ELECTRONICS INC., Seoul (KR)

(72) Inventors: Kihyun Jung, Gwacheon-Si (KR); Jinmoo Park, Seoul (KR); Inchang Chu, Seoul (KR); Jeongkyo Seo, Anyang-Si (KR); Jaesung Lee, Suwon-Si (KR)

(73) Assignee: LG ELECTRONICS INC., Seoul (KR)

( * ) Notice: Subject to any disclaimer, the term of this patent is extended or adjusted under 35 U.S.C. 154(b) by 328 days.

This patent is subject to a terminal disclaimer.

(21) Appl. No.: 15/606,853

(22) Filed: May 26, 2017

(65) Prior Publication Data

US 2017/0264341 A1    Sep. 14, 2017

Related U.S. Application Data

(63) Continuation of application No. 14/125,016, filed as application No. PCT/KR2012/004600 on Jun. 11, 2012, now Pat. No. 9,692,487.

(30) Foreign Application Priority Data

Jun. 10, 2011 (KR) .................. 10-2011-0056446

(51) Int. Cl.
*H04B 5/00* (2006.01)
*H02J 50/20* (2016.01)
(Continued)

(52) U.S. Cl.
CPC ............ *H04B 5/0037* (2013.01); *H02J 7/025* (2013.01); *H02J 50/12* (2016.02); *H02J 50/20* (2016.02); *H02J 50/80* (2016.02); *H02J 50/90* (2016.02)

(58) Field of Classification Search
CPC ........ H04B 5/0037; H02J 50/90; H02J 50/80; H02J 7/025; H02J 50/12; H02J 50/20; H02J 17/00
See application file for complete search history.

(56) References Cited

U.S. PATENT DOCUMENTS 5,963,012 A   10/1999   Garcia et al.
6,271,764 B1   8/2001   Okamura
(Continued)

FOREIGN PATENT DOCUMENTS

| JP | 2009-89465 A | 4/2009 |
|---|---|---|
| KR | 10-2010-0088117 A | 8/2010 |
| KR | 10-2010-0112033 A | 10/2010 |

*Primary Examiner* — Jared Fureman
*Assistant Examiner* — Michael J Warmflash
(74) *Attorney, Agent, or Firm* — Birch, Stewart, Kolasch & Birch, LLP

(57) ABSTRACT

A wireless power transmitter for transmitting power by wireless to a terminal includes a power conversion unit and a power transmission control unit. The power conversion unit forms a wireless power signal for wireless power transfer using power supplied from a power supply unit. The power transmission control unit regulates a characteristic of the supplied power, based on orientation information of the terminal. A terminal includes a power receiving unit and a control unit. The power receiving unit receives a wireless power signal formed by a wireless power transmitter. The control unit detects whether or not an orientation of the terminal is changed while the wireless power signal is received, and transmits a control message for power regu- (Continued)

lation to the wireless power transmitter when the change in the orientation of the terminal is detected.

21 Claims, 7 Drawing Sheets

(51) Int. Cl.
*H02J 50/12* (2016.01)
*H02J 7/02* (2016.01)
*H02J 50/80* (2016.01)
*H02J 50/90* (2016.01)

(56) References Cited

U.S. PATENT DOCUMENTS

| | | | |
|---|---|---|---|
| 6,490,176 B2 * | 12/2002 | Holzer | .................... H02J 5/005 363/20 |
| 7,643,619 B2 | 1/2010 | Jung | |
| 7,705,565 B2 | 4/2010 | Patino et al. | |
| 7,751,852 B2 | 7/2010 | Kavounas | |
| 8,090,400 B2 * | 1/2012 | Kavounas | ........... H04M 19/045 455/550.1 |
| 8,903,456 B2 | 12/2014 | Chu et al. | |
| 9,041,346 B2 | 5/2015 | Nakama | |
| 2007/0024238 A1 | 2/2007 | Nakade et al. | |
| 2009/0140691 A1 | 6/2009 | Jung | |
| 2009/0212736 A1 | 8/2009 | Baarman et al. | |
| 2010/0036773 A1 | 2/2010 | Bennett | |
| 2010/0201315 A1 * | 8/2010 | Oshimi | ................. H01M 10/46 320/108 |
| 2011/0270462 A1 | 11/2011 | Amano et al. | |
| 2011/0309688 A1 * | 12/2011 | Yamazaki | .............. H02J 7/025 307/104 |
| 2012/0052923 A1 | 3/2012 | Park | |

* cited by examiner

APPARATUS FOR HANDLING CHANGE IN ORIENTATION OF TERMINAL DURING WIRELESS POWER TRANSFER AND METHOD THEREOF

CROSS REFERENCE TO THE RELATED APPLICATIONS

This application is a Continuation of co-pending application Ser. No. 14/125,016, filed on Dec. 9, 2013, which was filed as PCT International Application No. PCT/KR2012/004600 on Jun. 11, 2012, which claims the benefit under 35 U.S.C. § 119(a) to Patent Application No. 10-2011-0056446, filed in Republic of Korea on Jun. 10, 2011, all of which are hereby expressly incorporated by reference into the present application.

TECHNICAL FIELD

The present invention relates to wireless power transfer, and more particularly, to a wireless power transfer apparatus for controlling a characteristic of power or controlling a terminal to change a configuration of the terminal when the orientation of the terminal is changed during wireless power transfer, a terminal and a method thereof.

BACKGROUND ART

Recently, terminals provide not only a basic communication function but also various functions including a multimedia photographing and reproducing function, a game function, a digital broadcasting function, a wireless Internet function, etc. Such a terminal generally uses a battery for the purpose of portability.

The battery of the terminal requires charging. The charging method of the battery may be a wired charging method and a wireless charging method. The wired charging method is currently generalized, but a wireless charging system using an electromagnetic induction phenomenon has recently been developed. The wireless charging system uses a method of applying power to a wireless power transmitter having a coil included therein and charging a battery using induction current generated in a coil included in a terminal or battery due to the electromagnetic field generated in the coil of the wireless power transmitter, and the method is divided into inductive coupling and electromagnetic resonance coupling. That is, in the wireless charging system, the terminal is positioned within the range of the wireless power transmitter generating an electromagnetic field, so that the charging of the battery can be easily performed.

However, when the distance from the wireless power transmitter to the terminal is increased or when the position of the terminal is separated from a certain range of the wireless power transmitter, the charging efficiency of the wireless charging method using the inductive coupling is lowered. Therefore, when the terminal is separated from the range of the wireless power transmitter, the terminal cannot be charged to the maximum efficiency so as to perform various functions of the terminal. Accordingly, it is necessary to easily perform the functions of the terminal without separating the terminal from the range of the wireless power transmitter.

To satisfy such a necessity, a charging method using the electromagnetic resonance coupling has been developed, which prevents the lowering of the charging efficiency according to the distance between the wireless power transmitter and the terminal, but there is still an inconvenience in using the terminal during the charging of the terminal.

SUMMARY OF THE INVENTION

Therefore, an object of the present invention is to provide a wireless power transmitter for informing a terminal of the separation or orientation of the terminal of the wireless power transmitter or controlling the terminal to perform a specific function based on orientation information of the terminal without separating the terminal from the range of the wireless power transmitter, during the transmission of power by wireless to the terminal, and a method thereof.

To achieve these and other advantages and in accordance with the purpose of the present invention, as embodied and broadly described herein, there is provided a wireless power transmitter for transmitting power by wireless to a terminal, including: a power conversion unit configured to form a wireless power signal for wireless power transfer using power supplied from a power supply unit; and a power transmission control unit configured to regulate a characteristic of the supplied power, based on orientation information of the terminal.

The characteristic of the supplied power may be regulated so that a wireless power transmission method is converted, and the wireless power transmission method may include inductive coupling or electromagnetic resonance coupling.

The characteristic of the supplied power may be regulated so that a power transmission speed is increased.

The wireless power transmitter may further include an output unit configured to visually or auditorily output the orientation information or information on the regulated characteristic of the power.

The power transmission control unit may detect an orientation of the terminal, based on a change in the power for forming the wireless power signal.

The wireless power transmitter may further include a communication unit configured to perform data communication with the terminal. The power transmission control unit may receive the orientation information through the communication unit.

To achieve the above aspect of the present invention, there is provided a terminal including: a power receiving unit configured to receive a wireless power signal formed by a wireless power transmitter; and a control unit configured to detect whether or not an orientation of the terminal is changed while the wireless power signal is received, and transmit a control message for power regulation to the wireless power transmitter when the change in the orientation of the terminal is detected.

The control message for power regulation may be a message that requests the wireless power transmitter to finish the wireless power transfer through the wireless power signal.

The control message for power regulation may be a message that requests the wireless power transmitter to convert the power transmission method.

The control message for power regulation may be a message that requests the wireless power transmitter to change the power transmission speed of the wireless power signal.

The control unit may determine the power transmission speed, based on the changed orientation of the terminal, and the power transmission speed may include rapid charging or general charging.

When the change of the orientation of the terminal is detected, the control unit may control the terminal to output information on the transmitted power.

When the change in the orientation of the terminal is detected, and the strength of the wireless power signal is smaller than a critical value, the control unit may visually or auditorily notify that the orientation of the terminal has been changed.

When the change in the orientation of the terminal is detected, the control unit may execute a predetermined program.

When the change in the orientation of the terminal is detected, the control unit may change a configuration, based on the changed orientation of the terminal.

The orientation of the terminal may represent a direction of the terminal placed on an interface surface of the wireless power transmitter, and the direction of the terminal may be determined based on whether the direction of the terminal is a relative direction of a main body of the terminal with respect to a reference location on the interface surface or a direction in which the main body of the terminal views the interface surface.

The control unit may detect the change in the orientation of the terminal by detecting whether the direction of the main body of the terminal is changed between portrait and landscape directions or whether the surface viewing the interface surface is changed between top and bottom sides of the main body of the terminal.

When the change in the orientation of the terminal is detected, the control unit may change the configuration so that a sound signal is output to a speaker.

When the change in the orientation of the terminal is detected during receiving of a call signal, the control unit may receive the call signal and change the configuration so that a sound signal is output to a speaker.

When the change in the orientation of the terminal is detected during receiving of a call signal, the control unit may receive the call and transmit voice data to another terminal receiving the call, or may not receive the call but transmit character data to another terminal receiving the call.

According to embodiments of the present disclosure, a user easily performs various functions of the terminal without separating the terminal from a certain range of a wireless power transmitter.

DETAILED DESCRIPTION OF THE EMBODIMENTS OF THE INVENTION

Figure 1:
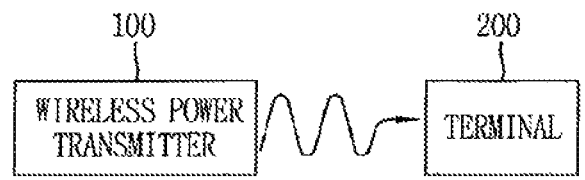
FIG. 1 is an exemplary view conceptually illustrating a wireless power transmitter and a terminal according to embodiments of the present disclosure.

Technical terms used in this specification are used to merely illustrate specific embodiments, and should be understood that they are not intended to limit the present disclosure. As far as not being defined differently, all terms used herein including technical or scientific terms may have the same meaning as those generally understood by an ordinary person skilled in the art to which the present disclosure belongs to, and should not be construed in an excessively comprehensive meaning or an excessively restricted meaning. In addition, if a technical term used in the description of the present disclosure is an erroneous term that fails to clearly express the idea of the present disclosure, it should be replaced by a technical term that can be properly understood by the skilled person in the art. In addition, general terms used in the description of the present disclosure should be construed according to definitions in dictionaries or according to its front or rear context, and should not be construed to have an excessively restrained meaning.

The terminology used herein is for the purpose of describing particular embodiments only and is not intended to be limiting of the invention. It will be further understood that the terms "includes" and/or "including," when used in this specification, specify the presence of stated features, integers, steps, operations, elements, and/or components, but do not preclude the presence and/or addition of one or more other features, integers, steps, operations, elements, components, and/or groups thereof.

In the following description, suffixes "module" and "unit or portion" for components used herein in description are merely provided only for facilitation of preparing this specification, and thus they are not granted a specific meaning or function.

In the drawings, the thickness of layers, films and regions are exaggerated for clarity. Like numerals refer to like elements throughout.

Reference will now be made in detail to the preferred embodiments of the present invention, examples of which are illustrated in the accompanying drawings. It will also be apparent to those skilled in the art that various modifications and variations can be made in the present invention without departing from the spirit or scope of the invention. Thus, it is intended that the present invention cover modifications and variations of this invention provided they come within the scope of the appended claims and their equivalents.

Description will now be given in detail of an apparatus for handling a change in orientation of a terminal during wireless power transfer and a method thereof according to an embodiment, with reference to the accompanying drawings.

FIG. 1 is an exemplary view conceptually illustrating a wireless power transmitter and a terminal according to embodiments of the present disclosure.

As can be seen with reference to FIG. 1, the wireless power transmitter 100 may be a power transmission apparatus that transmits required power by wireless to the terminal 200.

The wireless power transmitter 100 may be a wireless charging apparatus that charges a battery of the terminal 200 by transferring power by wireless to the terminal 200. An embodiment in which the wireless power transmitter 100 is implemented as a wireless charging apparatus will be described later with reference to FIG. 3.

In addition, the wireless power transmitter 100 may be implemented as various types of apparatuses for transmitting power to the terminal 200 that requires the power in the state in which the wireless power transmitter 100 does not come in contact with the terminal 200.

The terminal 200 is a device that can operate by receiving power by wireless from the wireless power transmitter 100. The terminal 200 may charge the battery using the received wireless power.

Meanwhile, it should be construed that the terminal 200 receiving power by wireless includes all electronic devices, e.g., a mobile phone, a cellular phone, a smart phone, a personal digital assistant (PDA), a portable multimedia player (PMP) and a tablet or multimedia devices, as well as input/output apparatuses such as a keyboard, a mouse and a video or audio auxiliary output device.

The terminal 200, as will be described later, may be a mobile communication terminal (e.g., a mobile phone, cellular phone or table phone) or a multimedia device. An embodiment in which the terminal 200 is implemented as a mobile communication terminal will be described later with reference to FIG. 4.

Meanwhile, the wireless power transmitter 100 may use one or more wireless power transmission methods so as to transmit power by wireless to the terminal 200 without any contact between the wireless power transmitter 100 and the terminal 200. That is, the wireless power transmitter 100 may transmit power using one or more of inductive coupling and electromagnetic resonance coupling. Here, the inductive coupling is based on an electromagnetic induction phenomenon occurring due to the wireless power signal, and the electromagnetic resonance coupling is based on an electromagnetic resonance phenomenon occurring due to a wireless power signal of a specific frequency.

The wireless power transfer using the inductive coupling is a technique for transferring power by wireless using primary and secondary coils. In the wireless power transfer using the inductive coupling, current is induced to another coil by a variable magnetic field generated in one coil by the electromagnetic induction phenomenon, thereby transferring power.

In the wireless power transfer using the electromagnetic resonance coupling, electromagnetic resonance is generated in the terminal 200 by the wireless power signal transmitted from the wireless power transmitter 100, and power is transmitted from the wireless power transmitter 100 to the terminal 200 by the electromagnetic resonance phenomenon.

Hereinafter, embodiments of the wireless power transmitter 100 and the terminal 200, which are disclosed in the present disclosure, will be described in detail. In adding reference numerals to components of each drawing, it is noted that the same reference numerals are used to designate the same components even though the same components are shown in other drawings.

FIGS. 2(a) and 2(b) are block diagrams illustrating configurations of the wireless power transmitter 100 and the terminal 200, applicable in embodiments of the present disclosure, respectively.

FIG. 2(a)—Wireless Power Transmitter

Referring to FIG. 2(a), the wireless power transmitter 100 includes a power transmission unit 110. The power transmission unit 110 may include a power conversion unit 111 and a power transmission control unit 112.

The power conversion unit 111 converts power supplied from a power supply unit 190 of the wireless power transmitter 100 into a wireless power signal and transmits the converted wireless power signal to the terminal 200. The wireless power signal transmitted by the power conversion unit 111 is formed in a magnetic field or electromagnetic field which is oscillated. To this end, the power conversion unit 111 may include a coil through which the wireless power signal is generated.

The power conversion unit 111 may include a component for generating a wireless power signal according to each of the wireless power transmission methods.

In some embodiments, the power conversion unit 111 may include a primary coil for generating a variable magnetic field so as to induce current to a secondary coil of the terminal 200 according to the inductive coupling. In some embodiment, the power conversion unit 111 may include a coil (or antenna) for generating a magnetic field having a specific frequency so as to cause a resonance phenomenon to occur in the terminal 200 according to the electromagnetic resonance coupling.

In some embodiment, the power conversion unit 111 may transmit power using one or more of the inductive coupling and the electromagnetic resonance coupling.

Meanwhile, the power conversion unit 111 may further include a circuit capable of controlling characteristics of frequency used to generate the wireless power signal, applied voltage, current, etc.

The power transmission control unit 112 controls each of the components included in the power transmission unit 110. In some embodiments, the power transmission control unit 112 may be implemented to be integrated with another control unit (not shown) controlling the wireless power transmitter 100.

Meanwhile, the area in which the wireless power signal can approach may be divided into two areas. First, an active area refers to an area through which the wireless power signal for transmitting power to the terminal 200 passes. Next, a semi-active area refers to an interest area in which the wireless power transmitter 100 can sense the existence of the terminal 200. Here, the power transmission control unit 112 may sense whether the terminal 200 has been placed in or removed from the active area or the semi-active area. Specifically, the power transmission control unit 112 may sense whether the terminal 200 has been displaced in the active area or the semi-active area, using the wireless power signal generated in the power conversion unit 111 or using a separate sensor. For example, the power transmission control unit 112 may sense the existence of the terminal 200 by monitoring whether or not the property of power for generating the wireless power signal in the power conversion unit 111 is changed due to the wireless power signal influenced by the terminal 200 existing in the semi-active area. However, the active area and the semi-active area may be changed depending on the wireless power transmission method including the inductive coupling, the electromagnetic resonance coupling, etc.

The location of the active area may be displayed on an interface surface of the wireless power transmitter 100 or the terminal 200, for example, using a method of displaying a logo or another visual marking. The active area may be centered within the interface surface of the wireless power transmitter 100 or the terminal 200.

According to an embodiment of the present disclosure, when the terminal 200 is placed in the active area or semi-active area, the power transmission control unit 112 may sense an orientation of the terminal 200. Specifically, the power transmission control unit 112 may sense whether or not the terminal 200 has an orientation in the active area or semi-active area using a change in strength of a wireless power signal formed in the power conversion unit 111. The orientation indicates the direction of the terminal 200 placed on the interface surface of the wireless power transmitter 100, and the direction of the terminal 200 is determined based on whether or not the direction of the terminal 200 is the relative direction of a main body of the terminal 200 with respect to a reference location on the interface surface or the direction in which the main body of the terminal 200 views the interface surface. The power transmission control unit 112 senses a change in orientation by detecting whether the direction of the main body of the terminal 200 is changed between portrait and landscape directions or whether the surface viewing the interface surface is changed between top and bottom sides of the main body of the terminal 200, based on the intensity of current or voltage of the changed wireless power signal. The power transmission control unit 112 may inform the terminal 200 of whether or not the orientation has been changed, using a method of data communication, etc., through the communication unit 130.

The power transmission control unit 112 may determine whether to perform a process of identifying the terminal 200 or to initiate wireless power transfer, based on the result obtained by detecting the existence of the terminal 200.

The power transmission control unit 112 may determine one or more characteristics of the frequency, voltage and current of the power conversion unit 111 for generating the wireless power signal. The determination of the characteristics may be made under a condition of the wireless power transmitter 100 or under a condition of the terminal 200. In some embodiments, the power transmission control unit 112 may determine the characteristics based on device identification information of the terminal 200. In some embodiments, the power transmission control unit 112 may determine the characteristics based on required power information of the terminal 200 or profile information on the required power of the terminal 200.

According to an embodiment of the present disclosure, when the orientation of the terminal 200 is sensed, the power transmission control unit 112 may change one or more characteristics of the frequency, voltage and current used to form a wireless power signal, based on orientation information. This may be represented in the form of rapid charging, general charging, etc.

According to an embodiment of the present disclosure, when the orientation of the terminal 200 is sensed, the power transmission control unit 112 may perform conversion of the wireless power transmission method between the inductive coupling and the electromagnetic resonance coupling, based on the orientation information. The conversion of the wireless power transmission method enables a method having higher charging efficiency to be selected according to the distance between the wireless power transmitter 100 and the terminal 200 in the transmission of power by wireless.

The power transmission control unit 112 may receive a power control message from the terminal 200. The power transmission control unit 112 may determine one or more characteristics of the frequency, voltage and current of the power conversion unit 111, based on the received power control message. In addition, the power transmission control unit 112 may perform another control operation based on the power control message.

For example, the power transmission control unit 112 may determine one or more characteristics of the frequency, voltage and current used to generate the wireless power signal, based on the power control message containing one or more of rectified electric energy information, charging state information and identification information of the terminal 200.

As another control operation using the power control message, the wireless power transmitter 100 may perform a general control operation related to wireless power transfer based on the power control message. For example, the wireless power transmitter 100 may receive information to be audibly or visibly output in relation to the terminal 200 or may receive information necessary for authentication between devices, through the power control message.

To receive the power control message described above, the power transmission control unit 112 may use at least one of a method of receiving a power control message through a wireless power signal and a method of receiving other user data.

To receive the power control message, the wireless power transmitter 100 may further include a modulation/demodulation unit 113 electrically connected to the power conversion unit 111. The modulation/demodulation unit 113 may be used to receive the power control message through a wireless power signal.

In addition, the power transmission control unit 112 may obtain the power control message by receiving user data containing the power control message using a communication means (not shown) included in the wireless power transmitter 100.

FIG. 2(b)—Terminal

Referring to FIG. 2(b), the terminal 200 includes a power supply unit 290. The power supply unit 290 supplies power necessary for the operation of the terminal 200. The power supply unit 290 may include a power receiving unit 291 and a power receiving control unit 292.

The power receiving unit 291 receives power transmitted by wireless from the wireless power transmitter 100.

The power receiving unit 291 may include a component necessary for receiving the wireless power signal according to the wireless power transmission method. The power receiving unit 291 may receive power according to one or more wireless power transmission methods. In this case, the power receiving unit 291 may include components required according to each of the wireless power transmission methods.

First, the power receiving unit 291 may include a coil for receiving a wireless power signal transmitted in the form of a magnetic or electromagnetic field having a vibration property.

For example, in some embodiments, the power receiving unit 291 may include a secondary coil to which current is induced by a magnetic field changed as a component according to the inductive coupling. In some embodiments, the power receiving unit 291 may include a resonance generation circuit and a coil in which electromagnetic resonance is generated by a magnetic field having a specific resonance frequency as a component according to the electromagnetic resonance coupling.

However, in some embodiments, the power receiving unit 291 may receive power according to one or more of wireless power transmission methods. In this case, the power receiving unit 291 may be implemented to receive power using one coil or may be implemented to receive power using a coil formed according to each of the wireless power transmission methods.

Meanwhile, the power receiving unit 291 may further include a rectifying circuit and a smoothing circuit, which convert the wireless power signal into a DC signal. The power receiving unit 291 may further include a circuit for preventing overvoltage or overcurrent from being generated by the received power signal.

The power receiving control unit 292 controls each of the components included in the power supply unit 290.

Specifically, the power receiving control unit 292 may transmit a power control message to the wireless power transmitter 100. The power control message may be used to initiate or finish transmitting a wireless power signal to the wireless power transmitter 100. The power control message may be used to instruct the wireless power transmitter 100 to control characteristics of the wireless power signal.

In some embodiments, the power receiving control unit 292 may transmit the power control message through the wireless power signal. In some embodiment, the power receiving control unit 292 may transmit the power control message using at least one of a method of transmitting the power control message through a wireless power signal and a method of transmitting the power control message through other user data.

To transmit a power control message, the terminal 200 may further include a modulation/demodulation unit electrically connected to the power receiving unit 291. The modulation/demodulation unit 293, like that of the wireless power transmitter 100 described above, may be used to transmit the power control message through the wireless power signal. The modulation/demodulation unit 293 may be used as a means for controlling current and/or voltage flowing through the power conversion unit 111 of the wireless power transmitter 100.

In some embodiments, the power receiving control unit 292 may transmit a power control message to the wireless power transmitter 100 by transmitting user data containing the power control message using a communication means (not shown) included in the terminal 200.

In addition, the power supply unit 290 may further include a charging unit 298 and a battery 299.

The terminal 200 receiving power for its operation from the power supply unit 290 may be operated by the power transmitted from the wireless power transmitter 100, or may be operated by the power charged to the battery 299 using the transmitted power. In this case, the power receiving control unit 292 may control the charging unit 298 to perform the charging of the battery using the transmitted power.

Hereinafter, an example of the wireless power transmitter 100 implemented in the form of a wireless charger will be described.

Figure 2:
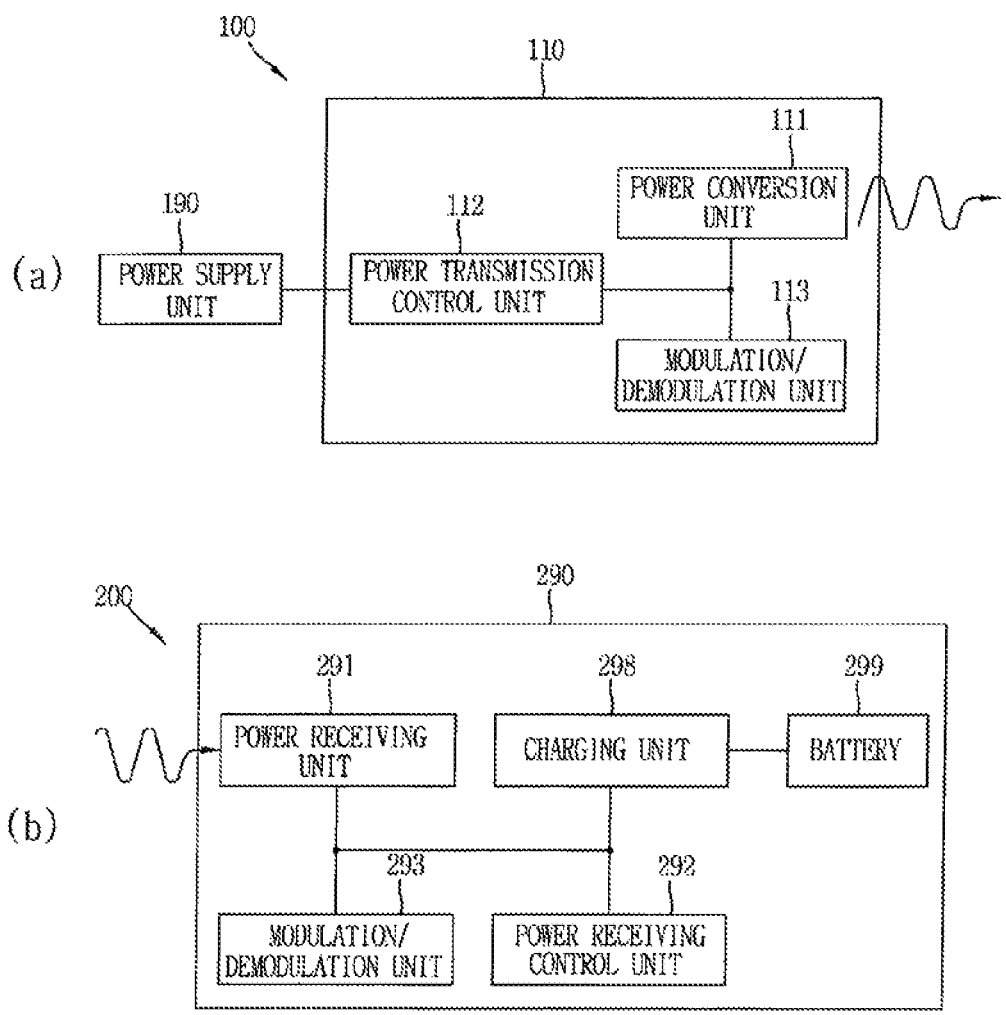
FIGS. 2(a) and 2(b) are block diagrams illustrating configurations of the wireless power transmitter and the terminal, applicable in embodiments of the present disclosure, respectively.
Figure 3:
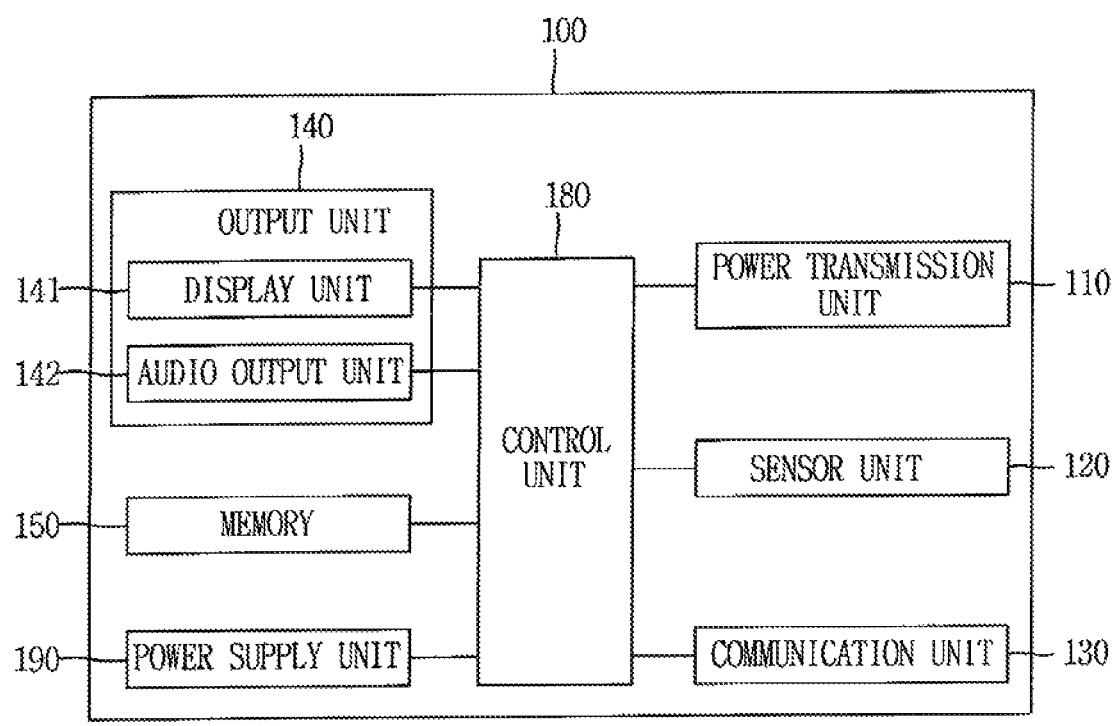
FIG. 3 is a block diagram illustrating a wireless power transmitter further including an additional configuration in addition to the configuration shown in FIG. 2(a)

FIG. 3 is a block diagram illustrating a wireless power transmitter further including an additional configuration in addition to the configuration shown in FIG. 2(*a*).

As can be seen with reference to FIG. 3, the wireless power transmitter 100 may further include a sensor unit 120, a communication unit 130, an output unit 140, a memory 150 and a control unit 180, in addition to the power transmission unit 110 and the power supply unit 190, which support one or more of the inductive coupling and the electromagnetic resonance coupling.

The control unit 180 controls the power transmission unit 110, the sensor unit 120, the communication unit 130, the output unit 140, the memory 150 and the power supply unit 190.

The sensor unit 120 may include a sensor that senses the position of the terminal 200.

Information on the position sensed by the sensor unit 120 may be used so that the power transmission unit 110 can efficiently transmit power.

For example, in the wireless power transmission according to the embodiments supporting the inductive coupling, the sensor unit 120 may operate as a position detection unit. The information on the position sensed by the sensor unit 120 may be used to move or rotate a transfer coil in the power conversion unit 111.

For example, the wireless power transmitter 100 according to the embodiments configured to the one or more transfer coils described above may determine coils, among the one or more transfer coils, which may be in the inductive coupling relationship or electromagnetic resonance coupling relationship with the receiving coil of the electronic device, based on location information of the terminal 200.

Meanwhile, according to an embodiment of the present disclosure, the sensor unit 120 may be configured to sense whether or not the orientation of the terminal 200 has been changed. For example, the sensor unit 120 may sense the presence of rotation of the terminal 200, the rotational direction of the terminal 200 or whether the output unit 140 of the terminal 200 contacts the wireless power transmitter 100 by sensing the position, weight and contact surface of the terminal 200. This may be performed in the power transmission control unit 112 of the wireless power transmitter 100. The wireless power transmitter 100 may use both the methods so as to determine the orientation of the terminal or to improve accuracy using one of both the methods.

The sensor unit 120 may be configured to monitor whether or not the terminal 200 comes close to an area in which charging is possible. The function of sensing whether or not the sensor unit 120 comes close may be performed separately from or combined with the function that the power transmission control unit 112 in the power transmission unit 110 senses whether or not the electronic device comes close.

The communication unit 130 performs wire/wireless data communication with the terminal 200. The communication unit 130 may include electronic components for one or more of Bluetooth™, Zigbee, ultra wide band (UWB), wireless USB, near field communication (NFC) and wireless LAN.

According to an embodiment of the present disclosure, the communication unit 130 may perform communication of data containing a control message for controlling each configuration area of the terminal 200 from the wireless power transmitter 100. When a call is received to the terminal 200 or when a user receives the received call so as to initiate communication, the communication unit 130 may receive, from the terminal 200, data containing information on the received call or video and/or audio information contained in the initiated communication.

The output unit 140 includes at least one of a display unit 141 and an audio output unit 142. The display unit 141 may include at least one of a liquid crystal display (LCD), a thin film transistor-liquid crystal display (TFT LCD), an organic light-emitting diode (OLED), a flexible display and a 3D display. The display unit 141 may display a charging state under a control of the control unit 180.

The memory 150 may include a storage medium of at least one of a flash memory type, a hard disk type, a multimedia card micro type, a card type memory (e.g., an SD or XD memory, etc.), a random access memory (RAM), a static random access memory (SRAM), a read-only memory (ROM), an electrically erasable programmable read-only memory (EEPROM), a programmable read-only memory (PROM), a magnetic memory, a magnetic disk and an optic disk. The wireless power transmitter 100 may operate in relation to web storage for performing a storage function of the memory 150 on the Internet.

Programs or commands executing the aforementioned functions of the wireless power transmitter 100 may be stored in the memory 150. The control unit 180 may execute the programs or commands stored in the memory 150 so as to transfer power by wireless. A memory controller (not shown) may be used so that other components (e.g., the control unit 180) included in the wireless power transmitter 100 access the memory 150.

Storage of Event According to Orientation

The power supply unit 190 receives power from the outside and supplies the received power so that the wireless power transmitter 100 operates. The wireless power transmitter 100 converts a portion of the power supplied from the power supply unit 190 into a wireless power signal and transmits the wireless power signal to the terminal 200.

It will be readily understood by those skilled in the art that the configuration of the wireless power transmitter 100 according to the embodiments of the present disclosure may be applied to devices such as a docking station, a terminal cradle device and other electronic devices, except that the configuration of the wireless power transfer apparatus is applicable to only the wireless charger.

Figure 4:
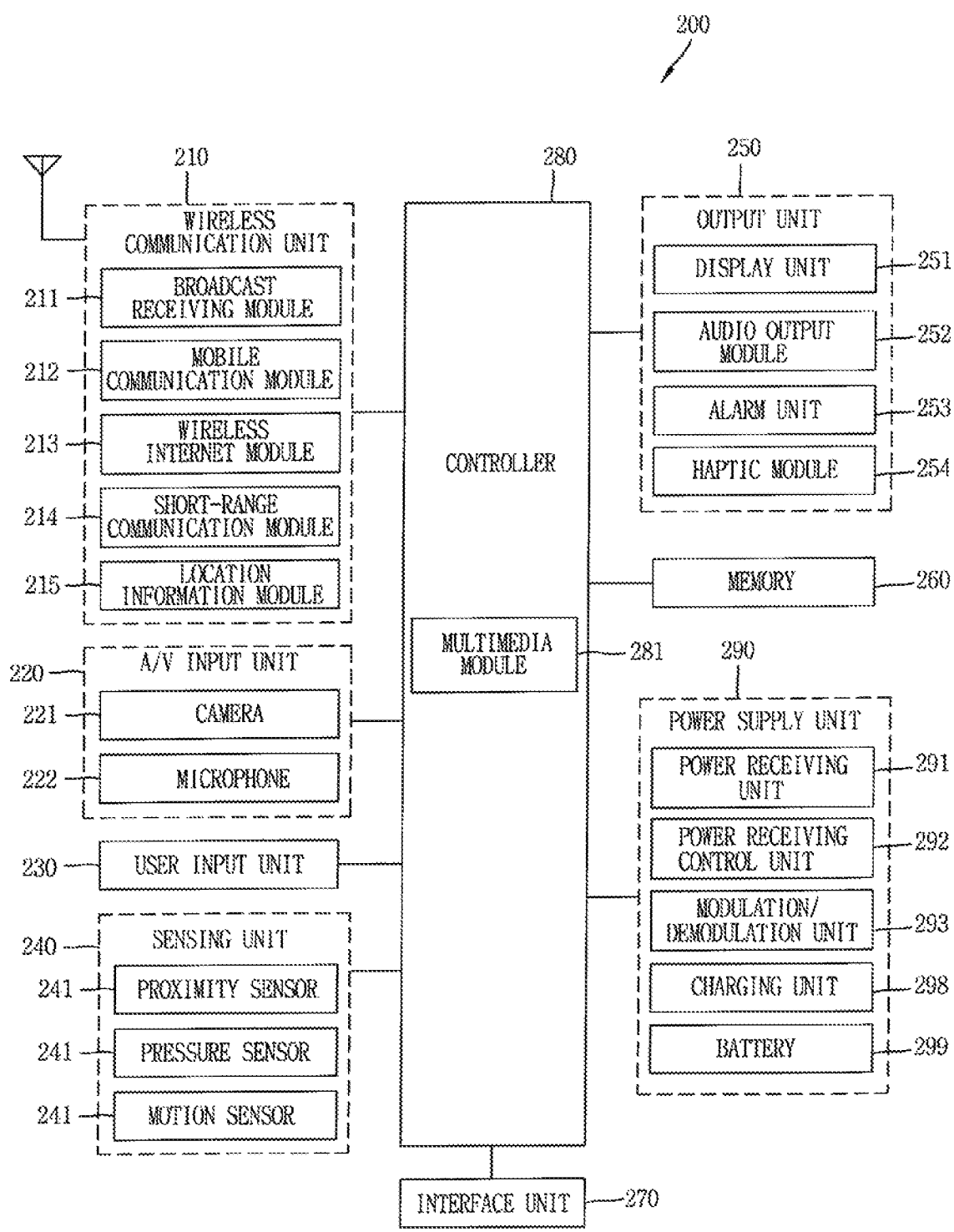
FIG. 4 is a block diagram illustrating a configuration of a terminal when the terminal is implemented in the form of a mobile terminal according to embodiments of the present disclosure.

FIG. 4 is a block diagram illustrating a configuration of a terminal when the terminal 200 is implemented in the form of a mobile terminal according to embodiments of the present disclosure.

The mobile terminal 200 includes the power supply unit 290 shown in FIG. 2.

The mobile terminal 200 may further include a wireless communication unit 210, audio/video (A/V) input unit 220, a user input unit 230, a sensing unit 240, an output unit 250, a memory 260, an interface unit 270 and a control unit 280. The components shown in FIG. 4 are not essential, and therefore, the mobile terminal may be implemented to have a larger number of components or to have a smaller number of components.

Hereinafter, the components will be sequentially described.

The wireless communication unit 210 may include one or more modules that enable wireless communication between the mobile terminal 200 and a wireless communication system, between the mobile terminal 200 and a network in which the mobile terminal 200 is placed, or between the mobile terminal 200 and the wireless power transmitter 100. For example, the wireless communication unit 210 may include a broadcast receiving module 211, a mobile communication module 212, a wireless Internet module 213, a short range communication module 214, a location information module 215, etc.

The broadcast receiving module 211 receives a broadcasting signal and/or broadcasting related information from an external broadcasting center through a broadcasting channel.

The broadcasting channel may include a satellite channel and a terrestrial channel. The broadcasting center may mean a server that generates a broadcasting signal and/or broadcasting related information and transfers the generated broadcasting signal and/or broadcasting related information to the mobile terminal or a server that receives a previously generated broadcasting signal and/or broadcasting related information and transfer the received broadcasting signal and/or broadcasting related information to the mobile terminal. The broadcasting signal may include not only a TV broadcasting signal, a radio broadcasting signal and a data broadcasting signal but also a broadcasting signal obtained by combining the data broadcasting signal with the TV broadcasting signal or radio broadcasting signal.

The broadcasting related information may mean information related to a broadcasting channel, broadcasting program or broadcasting service provider. The broadcasting related information may be provided through a mobile communication network. In this case, the broadcasting related information may be received by the mobile communication module 212.

The broadcasting related information may exist in various forms. For example, the broadcasting related information may exist in the form of an electronic program guide (EPG) of digital multimedia broadcasting (DMB), electronic service guide (ESG) of digital broadcast-handheld (DVB-H), etc.

The broadcast receiving module 211 may receive a digital broadcasting signal, for example, using a digital broadcasting system such as digital multimedia broadcasting-terrestrial (DMB-T), digital multimedia broadcasting-satellite (DMB-S), media forward link only (MediaFLO), digital video broadcasting-handheld (DVB-H) or integrated service digital broadcast-terrestrial (ISDB-T). It will be apparent that the broadcast receiving module 211 may be configured to be suitable for not only the digital broadcasting system but also another broadcasting system.

The broadcasting signal and/or the broadcasting related information received through the broadcast receiving module 211 may be stored in the memory 260.

The mobile communication module 212 transmits/receives a wireless signal with at least one of a base station, an external terminal and a server on the mobile communication network. The wireless signal may include a voice call signal, a video call signal and various types of data according to character/multimedia message transmission/reception.

The wireless Internet module 213 refers to a module for wireless Internet access, and may be built in the mobile terminal 200 or mounted to the outside of the mobile terminal 200. The wireless Internet access may include wireless LAN (Wi-Fi), wireless broadband (Wibro), world interoperability for microwave access (Wimax), high speed downlink packet access (HSDPA), etc.

The short range communication module 214 refers to a module for short range communication. The wireless short range communication may include Bluetooth, radio frequency identification (RFID), infrared data association (IrDA), ZigBee, etc. Meanwhile, the wired short range communication may include universal serial bus (USB), IEEE 1394, Thunderbolt™, etc.

The short range communication module 214 may establish data communication connection with the wireless power transmitter 100.

When there exists an audio signal to be output while transmitting power by wireless through the established data communication, the short range communication module 214 may transfer the audio signal to the wireless power transmitter 100 through the short range communication module. When there exists information to be displayed through the established data communication, the short range communication module 214 may transfer the information to the wireless power transmitter 100. Alternatively, the short range communication module 214 may receive an audio signal input through a microphone built in the wireless power transmitter 100 through the established data communication. The short range communication module 214 may transfer identification information (e.g., a phone number or device name in a cellular phone) of the mobile terminal 200 to the wireless power transmitter 100 through the established data communication.

According to an embodiment of the present disclosure, the short range communication module 214 may perform communication of data containing a control message for controlling each function of the mobile terminal 200 from the wireless power transmitter 100. When a call is received to the mobile terminal 200 or when a user receives the received call so as to initiate communication, the short range communication module 214 may receive, from the mobile terminal 200, data containing information on the received call or video and/or audio information contained in the initiated communication.

The location information module 215 refers to a module for obtaining the position of the mobile terminal, and a global positioning system (GPS) module may be used as an example of the location information module 215.

Referring to FIG. 4, the A/V input unit 220 is used to input an audio or video signal, and may include a camera 221, a microphone 222, etc. The camera 221 processes an image frame such as a still image or moving image obtained by an image sensor in a video call mode or photographing mode. The processed image frame may be displayed in the display unit 251.

The image frame processed in the camera 221 may be stored in the memory 260 or may be transferred to the outside through the wireless communication unit 210. The camera 221 may be provided with two or more cameras according to the environment used.

The microphone 222 receives an external sound signal in a call mode, recording mode, voice recognition mode, etc., and processes the received sound signal as voice data. The processed voice data may be converted and output to be transferred to a mobile communication station through the mobile communication module 212 in the call mode. Various noise removing algorithms for removing noise generated in the process of receiving an external sound signal may be implemented in the microphone 222.

The user input unit 230 generates input data for controlling the operation of a user terminal. The user input unit 230 may be configured as a key pad, dome switch, touch pad (static voltage/static current), a jog wheel, jog switch, etc.

The sensing unit 240 may include a proximity sensor 241, a pressure sensor, a motion sensor 243, etc. The proximity sensor 241 may detect, without any mechanical contact, an object approaching the mobile terminal 200, an object existing in the vicinity of the mobile terminal 200, etc. The proximity sensor 241 may detect an object approaching the mobile terminal 200 using a change in AC magnetic field or static magnetic field, a change in capacitance, etc. The proximity sensor 241 may be provided with two or more proximity sensors according to the environment used.

The pressure sensor 242 may detect whether or not pressure is applied to the mobile terminal 200, the strength of the pressure, etc. The pressure sensor 242 may be mounted at a portion necessary for detection of pressure in the mobile terminal 200 according to the environment used. If the pressure sensor 242 is mounted in the display unit 251, the pressure sensor 242 may identify a touch input through the display unit 251 and a pressure touch input of which pressure is greater than that of the touch input, according to the signal output from the pressure sensor 242. The pressure sensor 242 may detect the strength of the pressure applied to the display unit 251 when a pressure touch is input, according to the signal output from the pressure sensor 242.

The motion sensor 243 senses a position or motion of the mobile terminal 200 using an acceleration sensor, gyro sensor, etc. The acceleration sensor used for the motion sensor 243 is an element that changes a change in acceleration in any one direction into an electrical signal. The acceleration sensor is generally configured by mounting two or three axes in one package, and may require only one axis, i.e., the Z-axis according to the environment used. Therefore, when an acceleration sensor in the direction of the X- or Y-axis is used other than that in the direction of the Z-axis, the acceleration sensor may be mounted vertically to a main board using a separate piece of board. The gyro sensor is a sensor that measures an angular speed of the mobile terminal 200 performing a rotary motion, and may sense an angle at which the mobile terminal 200 is rotated with respect to each reference direction. For example, the gyro sensor may sense rotational angles, i.e., an azimuth, a pitch and a roll, with respect to the three directional axes.

According to an embodiment of the present invention, the orientation of the mobile terminal 200 may be sensed using the sensor.

The output unit 250 is used to generate an output related to a visual sense, auditory sense, a haptic sense, etc. The output unit 250 may include a display unit 251, an audio output module 252, an alarm unit 253, a haptic module 254, etc.

The display unit 251 displays (outputs) information processed in the mobile terminal 200. For example, when the mobile terminal 200 is in a call mode, the display unit 251 displays a user interface (UI) or graphic user interface (GUI) related to a call. When the mobile terminal 200 is in a video call mode or photographing mode, the display unit 251 displays a photographed or/and received image, UI or GUI.

The display unit 251 may include at least one of an LCD, a TFT LCD, an OLED, a flexible display and a 3D display.

Some of these displays may be configured as transparent or light-transmissive displays through which a user can see an outside view. These displays may be called as transparent displays, and transparent OLED, etc. may be used as a representative of the transparent displays. The rear structure of the display unit 251 may also be configured as a light-transmissive structure. Through such a structure, the user can see an object positioned at the rear of the mobile terminal 200 through an area occupied by the display unit 251 of the mobile terminal 200.

Two or more display units 251 may exist according to the implemented form of the mobile terminal 200. For example, a plurality of display units may be spaced apart or integrally displaced on one surface, or may be displaced on different surfaces, respectively.

When the display unit 251 and a sensor sensing a touch operation (hereinafter, referred to as a 'touch sensor') form an inter-layer structure (hereinafter, referred to as a 'touch screen'), the display unit 251 may be used as an input device as well as an output device. The touch sensor may have, for example, the form of a touch film, touch sheet, touch pad, etc.

The touch sensor may be configured to convert a change in pressure applied to a specific portion of the display unit 251 or capacitance generated at a specific portion of the display unit 251 into an electrical input signal. The touch sensor may be configured to detect not only the position and area of a touched portion but also the pressure at the touched portion.

When there is a touch input for the touch sensor, a signal(s) corresponding to the touch input is sent to a touch controller. The touch controller processes the signal(s) and then transfers corresponding data to the control unit 280. Accordingly, the control unit 280 can determine which area of the display unit 251 is touched, etc.

The proximity sensor 241 may be placed in an internal area of the mobile terminal surrounded by the touch screen or in the proximity of the touch screen. The proximity sensor 241 refers to a sensor that senses, without any mechanical contact, an object approaching a predetermined detection surface or the presence of existence of an object existing near the predetermined detection surface using an electromagnetic force or infrared ray.

For example, the proximity sensor 241 includes a transmissive photoelectric sensor, a mirror reflective photoelectric sensor, a high-frequency oscillation proximity sensor, a capacitive proximity sensor, a magnetic proximity sensor, an infrared proximity sensor, etc. When the touch screen is a capacitive touch screen, the touch screen is configured to detect the proximity of a pointer through a change in electric field according the proximity of the pointer. In this case, the touch screen (touch sensor) may be classified as the proximity sensor.

Hereinafter, for convenience of illustration, the action that the pointer comes close to the touch screen while not being contacted on the touch screen so as to be recognized that the pointer is placed on the touch screen is referred to as a "proximity touch," and the action that the pointer is substantially contacted on the touch screen is referred to as a "contact touch." The position at which the pointer is proximately touched on the touch screen means a position at which when the pointer is proximately touched, the pointer corresponds vertically to the touch screen.

The proximity sensor 241 senses a proximity touch action and a proximity touch pattern (e.g., a proximity touch distance, proximity touch direction, proximity touch speed, a proximity touch time, proximity touch position, proximity touch movement state, etc.). Information corresponding to the sensed proximity touch action and proximity touch pattern may be output on the touch screen.

The audio output module 252 may receive a call signal from the wireless communication unit 210 in a call or recoding mode, voice recognition mode, broadcast receiving mode, etc., and may output the audio data stored in the memory 260. The audio output module 252 may output a sound signal related to a function (e.g., a call signal receiving sound, message receiving sound, etc.) performed by the mobile terminal 200. The audio output module 252 may include a receiver, a speaker, a buzzer, etc.

The alarm unit 253 outputs a signal for informing that an event occurs in the mobile terminal 200. The event occurring in the mobile terminal 200 includes, for example, call signal reception, message reception, key signal input, touch input, etc. The alarm unit 253 may output, for example, a signal for informing the occurrence of an event through vibration, as well as a video or audio signal. Since the video or audio signal may be output through the display unit 251 or the audio output module 252, the display unit 251 and the audio output module 252 may be classified as a portion of the alarm unit 253.

The haptic module 254 generates various haptic effects that a user can feel. A vibration is used as a representative of the haptic effects generated by the haptic module 254. The intensity and pattern of the vibration generated by the haptic module 254 may be controlled. For example, different vibrations may be synthesized and output or may be sequentially output.

In addition to the vibration, the haptic module 254 may generate various haptic effects including an effect caused by the arrangement of pins performing a vertical movement on a contact skin surface, an effect caused by the jet force or absorption force of air through an absorption port, an effect caused by the graze through a skin surface, an effect caused by the contact of an electrode, an effect caused by a stimulus such as an electrostatic force, an effect caused by the reproduction of a cool and warm feeling using an element for heat absorption or generation, etc.

The haptic module 254 may be implemented not only to provide a user with a haptic effect through a direct contact but also to allow the user to feel a haptic effect through a muscle sense using a finger, arm, etc. The haptic module 254 may be provided with two or more haptic modules according to the environment used.

The memory 260 may store a program for operations of the control unit 280, and may temporarily store input/output data (e.g., a phone book, a message, a still image, a moving image, etc.). The memory 260 may store data for vibration and sound of various patterns, which are output when a touch is input on the touch screen.

In some embodiments, the memory 260 may store software components including an operating system (not shown), a module performing the function of wireless communication unit 210, a module operating together with the user input unit 230, a module operating together with the A/V input unit 220 and a module operating together with the output module 250. The operating system (e.g., LINUX, UNIX, OS X, WINDOWS, Chrome, Symbian, iOS, Android, VxWorks or another embedded operating system) may include various software components and/or drivers for controlling system tasks such as memory management and power management.

The memory 260 may store a configuration program related to wireless power transfer or wireless charging. The configuration program may be executed by the control unit 280.

The memory 260 may store an application related to the wireless power transfer (or wireless charging) downloaded from an application providing server (e.g., an App store). The application related to the wireless power transfer is a program for controlling the wireless power transfer. The electronic device 200 may receive power by wireless from the wireless power transmitter 100 through the corresponding program or may establish connection for data communication with the wireless power transmitter 100.

The memory 260 may include a storage medium of at least one of a flash memory type, a hard disk type, a multimedia card micro type, a card type memory (e.g., an SD or XD memory, etc.), a RAM, an SRAM, a ROM, an EEPROM, a PROM, a magnetic memory, a magnetic disk and an optic disk. The mobile terminal 200 may operate in relation to a web storage performing a storage function of the memory 260 on the Internet.

The interface unit 270 serves as a gateway to all external devices connected to the mobile terminal 200. The interface unit 270 may receive data from an external device, may receive power and provide the received power to each of the components in the mobile terminal 200, or may allow data in the mobile terminal 200 to be transmitted to the external device. For example, the interface unit 270 may include a wired/wireless headset port, an external charger port, a wired/wireless data port, a memory card port, a port for connecting an apparatus provided with an identification module, an audio input/output (I/O) port, a video I/O port, an earphone port, etc.

The identification module is a chip in which various information for authenticating the use right of the mobile terminal 200, and may include a user identify module (UIM), a subscriber identity module (SIM), a universal subscriber identity module USIM, etc. The apparatus provided with the identification module (hereinafter, referred to as an 'identification apparatus') may be manufactured in the form of a smart card. Therefore, the identification apparatus may be connected to the mobile terminal 200 through a port.

When the mobile terminal 200 is connected to an external cradle, the interface unit 270 may become a path along which power is supplied from the cradle to the mobile terminal 200, or may become a path along which various command signals input from the cradle are provided to the mobile terminal 200. The power or various command signals input from the cradle may be operated as a signal for recognizing that the mobile terminal 200 has been exactly mounted to the cradle.

The control unit 280 generally controls overall operations of the mobile terminal 200. For example, the control unit 280 performs relative control and processing for voice conversation, data communication, video conversation, etc. The control unit 280 may have a multimedia module 281 for multimedia reproduction. The multimedia module 281 may be implemented in the control unit 280 or may be implemented separately from the control unit 280. The control unit 280 may be implemented as a module separate from the power receiving control unit 292 in the power supply unit 290 described with reference to FIG. 2, or may be implemented as a single module.

The control unit 280 may perform pattern recognition processing so that a writing or drawing input performed on the touch screen can be recognized as a character or image.

The control unit 280 performs a wire or wireless charging operation according to a user input or internal input. The internal input is a signal for informing that inductive current generated in the secondary coil of the mobile terminal has been sensed.

According to an embodiment of the present invention, the control unit 280 may sense an orientation of the mobile terminal 200. The orientation indicates the direction of the mobile terminal 200 placed on the interface surface of the wireless power transmitter 100, and the direction of the mobile terminal 200 is determined based on whether or not the direction of the mobile terminal 200 is the relative direction of a main body of the mobile terminal 200 with respect to a reference location on the interface surface or the direction in which the main body of the mobile terminal 200 views the interface surface. The control unit 280 senses a change in orientation by detecting whether the direction of the main body of the mobile terminal 200 is changed between portrait and landscape directions or whether the surface viewing the interface surface is changed between top and bottom sides of the main body of the mobile terminal 200, based on the intensity of current or voltage of the changed wireless power signal.

As described above, the power receiving control unit 292 in the power supply unit 290 may be included in the control unit 280 to be implemented, and it can be understood that the operation of the power receiving control unit 292 is performed by the control unit 280.

The power supply unit 290 has a battery 299 supplying power to each of the components of the terminal 200, and may include a charging unit 298 for charging the battery 299 by wire or wireless.

The present disclosure has disclosed the mobile terminal as the wireless power receiving apparatus. However, it can be readily understood by those skilled in the art that the configuration according to the embodiments of the present disclosure may be applied to a fixed terminal such as a digital TV or desktop computer, except a case in which the configuration according to the embodiments of the present disclosure is applicable to only the mobile terminal.

Figure 5:
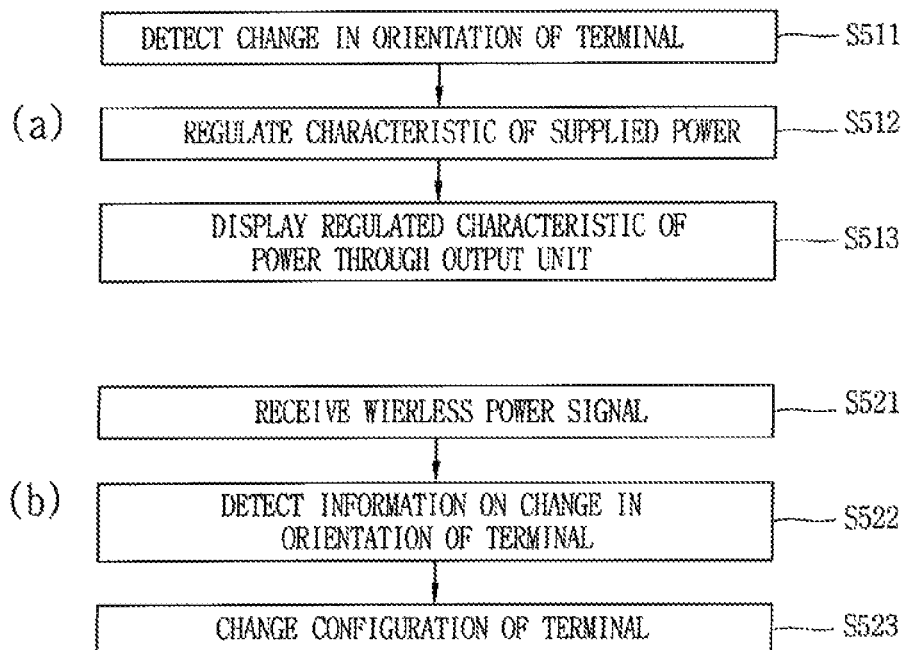
FIGS. 5(a) and 5(b) are flowcharts illustrating a process of handling a change in orientation of the terminal during wireless power transfer according to embodiments of the present disclosure.

FIG. 5 is a flowchart illustrating a process of handling a change in orientation of the terminal during wireless power transfer according to embodiments of the present disclosure.

FIG. 5(a) is a flowchart illustrating a process of regulating a characteristic of power based on a change in orientation of the terminal. FIG. 5(b) is a flowchart illustrating a process of changing a configuration based on a change in orientation of the terminal.

Hereinafter, a method of handling a change in orientation of the terminal during wireless power transfer will be described in detail with reference to FIG. 5.

FIG. 5(a) is a flowchart illustrating a process of regulating a characteristic of power based on a change in orientation of the terminal.

Referring to FIG. 5(a), the wireless power transmitter 100 first detects a change in orientation of the terminal 200 (S511).

The change in orientation enables the orientation of the terminal 200 to be detected based on a change in power supplied from the wireless power transmitter 100. The orientation indicates the direction of the mobile terminal 200 placed on the interface surface of the wireless power transmitter 100, and the direction of the terminal 200 is determined based on whether or not the direction of the terminal 200 is the relative direction of a main body of the terminal 200 with respect to a reference location on the interface surface or the direction in which the main body of the mobile terminal 200 views the interface surface. The power transmission control unit 112 senses a change in orientation by detecting whether the direction of the main body of the terminal 200 is changed between portrait and landscape directions or whether the surface viewing the interface surface is changed between top and bottom sides of the main body of the terminal 200, based on the intensity of current or voltage of the changed wireless power signal.

If the orientation of the terminal 200 is changed, all wireless power signals transmitted from the wireless power transmitter 100 cannot be transmitted to the terminal 200 while the axes of coils of the wireless power transmitter 100 and the terminal 200 cross each other, and therefore, the power for forming the transmitted wireless power signal is changed. In this case, the power transmission control unit 112 may sense the direction of the orientation of the terminal 200, i.e., whether the terminal 200 is rotated to the left or right, and whether the display unit 251 of the terminal 200 contacts an upper portion of the wireless power transmitter 100, based on a change of power.

Alternatively, the change in the orientation of the terminal 200 may be sensed by the sensor unit 120 of the wireless power transmitter 100. The sensor unit 120 may sense the presence of rotation of the terminal 200, the rotational direction of the terminal 200 or whether the output unit 140 of the terminal 200 contacts the wireless power transmitter 100 by sensing the position, weight and contact surface of the terminal 200.

Then, the wireless power transmitter 100 regulates a characteristic of the supplied power (S512).

For example, the wireless power transmitter 100 may change the transmission method of wireless power. Specifically, when the wireless power transmitter 100 supports power transmission methods using inductive coupling and electromagnetic resonance coupling, the wireless power transmitter 100 may convert one of the power transmission method into the other of the power transmission methods. When the terminal 200 contacts the wireless power transmitter 100 in the state in which the axes of the coils of the wireless power transmitter 100 and the terminal 200 correspond to each other, the wireless power transmitter 100 may transmit power with the maximum efficiency using the inductive coupling. However, when the terminal 200 does not contact the wireless power transmitter 100 or when the axes of the coils of the wireless power transmitter 100 and the terminal 200 cross each other due to the change in the orientation of the terminal 200, the wireless power transmitter 100 transmits power with a higher efficiency using the electromagnetic resonance coupling than that using the inductive coupling. Therefore, the charging method may be changed so that the wireless power transmitter 100 efficiently transmits power according to the state of the orientation of the terminal 200.

Alternatively, for example, the power conversion unit 111 may transmit power by wireless at a power transmission speed as high as possible in the state in which the position and orientation of the terminal 200 occurs.

The wireless power transmitter 100 may display a change in the characteristic of the power through the output unit 140 (S513). When the orientation of the terminal 200 is changed, the wireless power transmitter 100 may visually or auditorily output information on the change in orientation information on the regulated characteristic of the power through the output unit 140 provided to the wireless power transmitter 100.

According to another embodiment of the present disclosure, the change in the characteristic of the power transmitted by the wireless power transmitter 100 may be made by generating a control message for power regulation in the control unit 280 and transmitting the generated control message to the wireless power transmitter 100. In this case, the control message is a message that requests the wireless power transmitter 100 to change the power transmission method or a message that requests the wireless power transmitter 100 to change the power transmission speed of a wireless power signal. Alternatively, the control unit 280 of the terminal 200 may control the wireless power transmitter 100 to output information on the transmitted power or may control the wireless power transmitter 100 to visually or auditorily inform that the orientation of the terminal 200 has been changed when the strength of the wireless power signal is smaller than a critical value. Alternatively, when the orientation of the terminal 200 is sensed, the control unit 280 of the terminal 200 may transmit, to the wireless power transmitter 100, a control message that requests the wireless power transmitter 100 to finish transferring power through the wireless power signal.

FIG. 5(*b*) is a flowchart illustrating a process of changing a configuration based on a change in orientation of the terminal.

Referring to FIG. 5(*b*), the power receiving unit 291 of the terminal 200 receives a wireless power signal formed by the wireless power transmitter 100 (S521), and the control unit 280 of the terminal 200 detects information on a change in orientation of the terminal 200 (S522).

The orientation indicates the direction of the mobile terminal 200 placed on the interface surface of the wireless power transmitter 100, and the direction of the terminal 200 is determined based on whether or not the direction of the terminal 200 is the relative direction of a main body of the terminal 200 with respect to a reference location on the interface surface or the direction in which the main body of the mobile terminal 200 views the interface surface. The power transmission control unit 112 senses a change in orientation by detecting whether the direction of the main body of the terminal 200 is changed between portrait and landscape directions or whether the surface viewing the interface surface is changed between top and bottom sides of the main body of the terminal 200, based on the intensity of current or voltage of the changed wireless power signal.

Information on the change in the orientation of the terminal 200 may be detected by the power receiving control unit 292 of the terminal 200. Specifically, the power receiving control unit 292 may detect whether or not the terminal 200 has an orientation using a change in wireless power signal received by the terminal 200, while the wireless power signal is received from the wireless power transmitter 100. For example, the power receiving control unit 292 may detect the orientation of the terminal 200, based on the intensity of current or voltage of the changed wireless power signal.

Then, the control unit 280 of the terminal 200 changes a configuration of the terminal 200, based on the detected orientation of the terminal 200 (S523). For example, when the change in the orientation of the terminal 200 is detected while the terminal 200 receives a call, the control unit 280 receives the call and changes the configuration of the terminal 200 so that a sound signal is output to a speaker. Alternatively, the control unit 280 of the terminal 200 receives the call and transmits voice data to another terminal transmitting the call, or does not receive the call but changes the configuration of the terminal 200 so that character data is transmitted to another terminal transmitting the call. Alternatively, when the orientation of the terminal 200 is detected, the control unit 280 of the terminal 200 changes the configuration of the terminal 200 so that a sound signal is output to the speaker or controls the terminal 200 to execute a predetermined program.

Hereinafter, an embodiment in which an event occurs based on the orientation of the terminal 200 will be described in detail. The occurrence of the event is generally performed through the process shown in FIG. 5, but a portion of the components or process may be changed within the scope of the present disclosure, which can be embodied by those skilled in the art.

Figure 6:
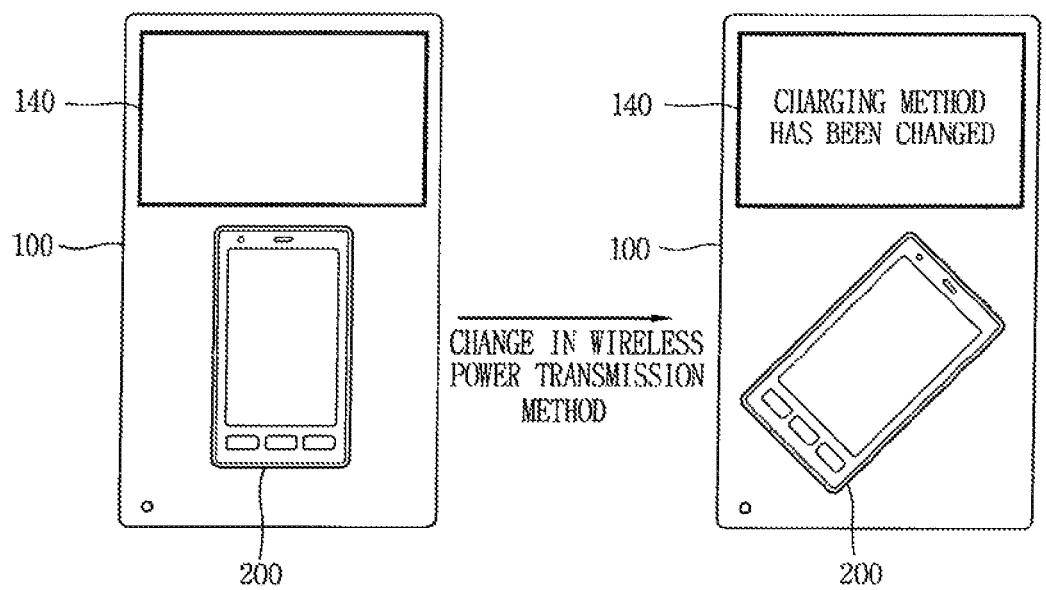
FIG. 6 is an exemplary view illustrating a state in which a characteristic of power is regulated based on the orientation of the terminal according to a first embodiment of the present disclosure.

FIG. 6—First Embodiment

FIG. 6 is an exemplary view illustrating a state in which a characteristic of power is regulated based on the orientation of the terminal according to a first embodiment of the present disclosure Referring to FIG. 6, when the orientation of the terminal 200 is changed, the wireless power transmitter 100 regulates a characteristic of power so that the wireless power transmission method is converted. Specifically, when the wireless power transmitter 100 supports power transmission methods using inductive coupling and electromagnetic resonance coupling, the wireless power transmitter 100 may convert one of the power transmission method into the other of the power transmission methods.

In case of the inductive coupling in a wireless power charging method, the efficiency of the wireless power charging method is high, but the distance to which power can be transmitted is limited. Therefore, when the terminal 200 is distant from the wireless power transmitter 100 or when the axes of the coils of the wireless power transmitter 100 and the terminal 200 cross each other due to the change in the orientation of the terminal 200, the efficiency of the wireless power charging method is rapidly decreased. However, although the terminal 200 is distant from the wireless power transmitter 100 or the axes of the coils cross each other, the distance to which power is transmitted by wireless in the electromagnetic resonance coupling is longer than that in the inductive coupling. Hence, although the terminal 200 is distant up to a certain distance from the wireless power transmitter 100, the efficiency of the wireless power charging method is not rapidly decreased.

Referring to the embodiment of FIG. 6, when the terminal supports both charging methods using the inductive coupling and the electromagnetic resonance coupling, the wireless power transmitter 100 may flexibly change one of both the charging methods into the other having high charging efficiency, based on the position or orientation of the terminal 200, in the wireless power charging method. In case where the charging efficiency is decreased when the charging method is performed using the inductive coupling due to the change in the orientation of the terminal 200, the power transmission control unit 112 controls the power conversion unit 111 to convert the inductive coupling into the electromagnetic resonance coupling in which the change in charging efficiency according to the distance is small.

Alternatively, the power transmission control unit 112 of the wireless power transmitter 100 may change the wireless power transmission method from the electromagnetic resonance coupling to the inductive coupling.

Alternatively, the power transmission control unit 112 of the wireless power transmitter 100 may display, through an output unit 140, a message for notifying that the wireless power transmission method has been changed. The notification message may be implemented a message "Charging method has been changed," "Charging method is changed into xx method," etc. The notification message may be implemented as a visual or auditory message, and is not limited to its form.

The notification message is not displayed through the output unit 140 provided to the wireless power transmitter 100 but may be displayed through the output unit 250 of the terminal 200. In this case, the control unit 280 of the terminal 200 controls the output unit 250 of the terminal 200 to perform an operation of notifying that the characteristic of the power has been changed, based on orientation information detected by the wireless power transmitter 100 or the terminal 200.

Figure 7:
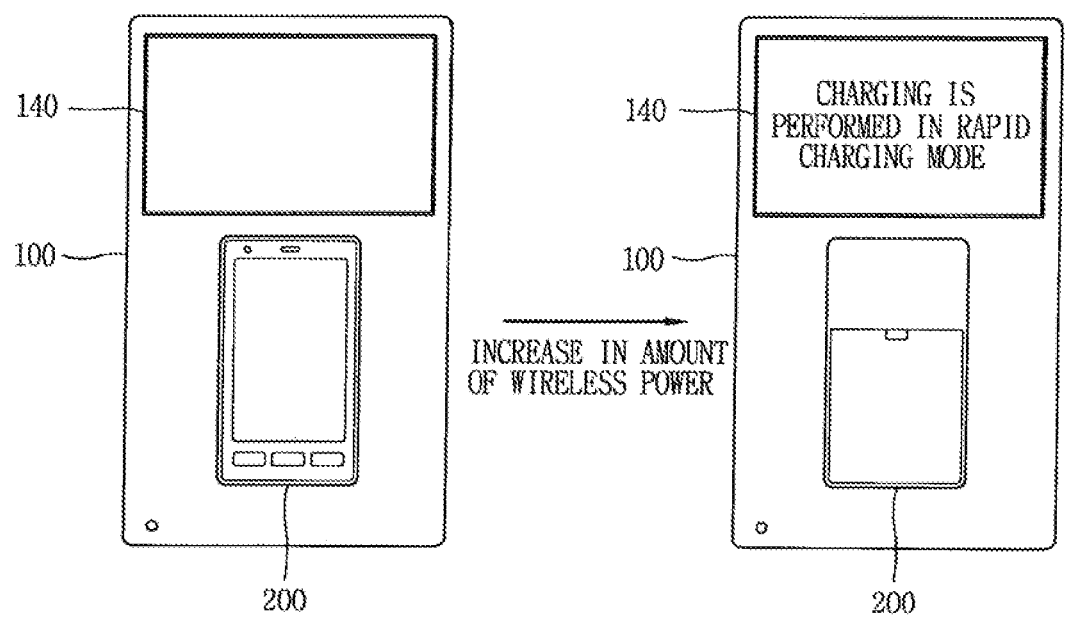
FIG. 7 is an exemplary view illustrating a state in which a characteristic of power is regulated based on the orientation of the terminal according to a second embodiment of the present disclosure.

FIG. 7—Second Embodiment

FIG. 7 is an exemplary view illustrating a state in which a characteristic of power is regulated based on the orientation of the terminal according to a second embodiment of the present disclosure.

Referring to FIG. 7, when the orientation of the terminal 200 is changed, the wireless power transmitter 100 regulates a characteristic of power for forming a wireless power signal so that the power transmission speed is increased. Specifically, if the orientation of the terminal 200 is changed into an orientation in which the display unit 251 of the terminal 200 contacts the wireless power transmitter 100, i.e., an orientation in which the top and bottom of the terminal are turned over, the wireless power transmitter 100 may transmit wireless power with the maximum power transmission speed at which the power conversion unit 111 can transmit the wireless power in the state in which the position and orientation of the terminal 200 is changed. When the orientation of the terminal 200 is detected, the power transmission control unit 112 of the wireless power transmitter 100 controls the power conversion unit 111 to transmit the wireless power with the maximum power transmission speed.

The power transmission control unit 112 of the wireless power transmitter 100 may control all auxiliary functions being executed on the memory of the terminal 200 to enter into a dormant state so as to maximize the charging efficiency of the terminal 200 when the power conversion unit 111 transfers the maximum power. Accordingly, all the transferred power is transmitted to the battery 299 of the terminal 200 without power loss due to the execution of the auxiliary functions of the terminal 200 during the charging of the terminal 200.

This may be represented in the form of rapid charging in the charging mode. In this case, the charging mode of the terminal 200 may have a general charging mode together with the rapid charging mode, and the conversion between the general charging mode and the rapid charging mode may be performed by the change in the orientation of the terminal 200 during the charging of the terminal 200.

Although it has been illustrated in FIG. 7 that when the display unit 251 of the terminal 200 contacts the wireless power transmitter 100, i.e., when the surface viewing the interface surface of the wireless power transmitter 100 is the top side of the main body of the terminal 200, the power transmission control unit 112 transfers the wireless power at the maximum power transmission speed, this is not limited to the change in the orientation of the terminal 200 performing such a control.

Alternatively, the power transmission control unit 112 of the wireless power transmitter 100 may display, through the output unit 140, a notification message for notifying that the wireless power is transferred with the maximum power. The notification message may be visually or auditorily displayed, and is not limited to its form.

In this case, the notification message may be implemented as a message "Charging is performed in rapid charging mode," "Power transmission speed is increased to the maximum," etc.

The notification message is not displayed through the output unit 140 provided to the wireless power transmitter 100 but may be displayed through the output unit 250 of the terminal 200. In this case, the control unit 280 of the terminal 200 controls the output unit 250 of the terminal 200 to perform an operation of notifying that the characteristic of the wireless power has been changed, based on orientation information detected by the wireless power transmitter 100 or the terminal 200.

Alternatively, when the orientation of the terminal 200 is changed, the terminal 200 measures a power receiving efficiency. Specifically, the control unit 280 of the terminal 200 measures the power receiving efficiency using the wireless power signal changed due to the change in the orientation of the terminal 200. When the orientation of the terminal 200 is not changed, the maximum power is transferred to the terminal 200. When the orientation of the terminal 200 is changed, power weaker than the maximum power is transferred while the axes of the coils respectively provided to the wireless power transmitter 100 and the terminal 200 cross each other. In this case, the power receiving efficiency may be measured using a ratio of actually transferred power to the maximum power.

The control unit 280 of the terminal 200 may control the terminal 200 to display the measured power receiving efficiency through the output unit 250 provided to the terminal 200. Alternatively, the charging efficiency is not displayed through the output unit 250 of the terminal 200 but may be displayed through the output unit 140 of the wireless power transmitter 100. In this case, the power transmission control unit 112 of the wireless power transmitter 100 may receive the charging efficiency calculated in the terminal 200, based on the orientation information of the terminal 200, through the communication and control the wireless power transmitter 100 to display the received charging efficiency through the output unit 140 of the wireless power transmitter 100.

Figure 8:
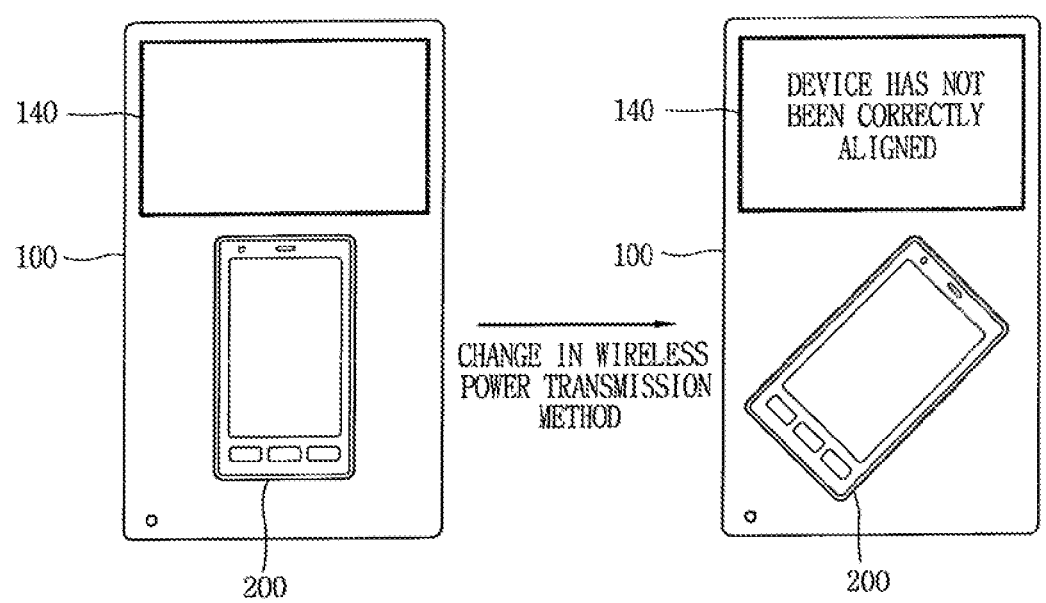
FIG. 8 is an exemplary view illustrating a state in which a characteristic of power is regulated based on the orientation of the terminal according to a third embodiment of the present disclosure.

FIG. 8—Third Embodiment

FIG. 8 is an exemplary view illustrating a state in which a characteristic of power is regulated based on the orientation of the terminal according to a third embodiment of the present disclosure.

The wireless power transmitter 100 or the terminal 200 may include a means allowing a user to exactly align the secondary coil of the terminal 200 with the primary coil of the wireless power transmitter 100. For example, the means may provide the user with not only direction notification representing where the user is to move the terminal 200 but also alignment notification, e.g., a feedback representing that the user has reached the exactly aligned position. The feedback includes a haptic feedback.

Meanwhile, when the secondary coil of the terminal 200 is not exactly aligned with the primary coil of the wireless power transmitter 100, the wireless power transmitter 100 may provide a visual, auditory or haptic feedback. The visual feedback may be provided through an operation of an LED, e.g. flickering of the LED or an operation of a red LED. The auditory feedback outputs a specific sound, and for example, may be provided by ringing a buzzer, etc. The haptic feedback may be provided, for example, by generating vibration.

Referring to FIG. 8, when the orientation of the terminal 200 is changed, the output unit 140 provided to the wireless power transmitter 100 may display a message for notifying that the orientation of the terminal 200 has been changed. The notification message may be implemented as one or more of an image, a voice, a beep sound and a vibration of the terminal 200. The notification message may be implemented as a message "Device is not correctly aligned," "Please, put device at correct position," "Orientation of device has been changed," etc., and is not limited to its form.

When the wireless power transmitter 100 transmits wireless power to the terminal 200 using the inductive coupling, the intensity of the wireless power transmitted to the terminal 200 as the orientation of the terminal 200 is changed. That is, when the alignment between the coils of the wireless power transmitter 100 and the terminal 200 is correct, the amount of wireless power to be transmitted to the terminal 200 is maximized. When the alignment between the coils of the wireless power transmitter 100 and the terminal 200 is incorrect due to the change in the orientation of the terminal 200, power smaller than the maximum amount of wireless power is transmitted to the terminal 200. Thus, the wireless power transmitter 100 allows the terminal 200 to be correctly aligned by notifying that the alignment between the coil of the wireless power transmitter 100 and the terminal 200 has been incorrect, so that the wireless power can be transmitted as the maximum power.

The notification message is not displayed through the output unit 140 provided to the wireless power transmitter 100 but may be displayed through the output unit 250 of the terminal 200. In this case, the control unit 280 of the terminal 200 controls the output unit 250 of the terminal 200 to perform an operation of notifying that the characteristic of the power has been changed, based on orientation information detected by the wireless power transmitter 100 or the terminal 200.

Figure 9:
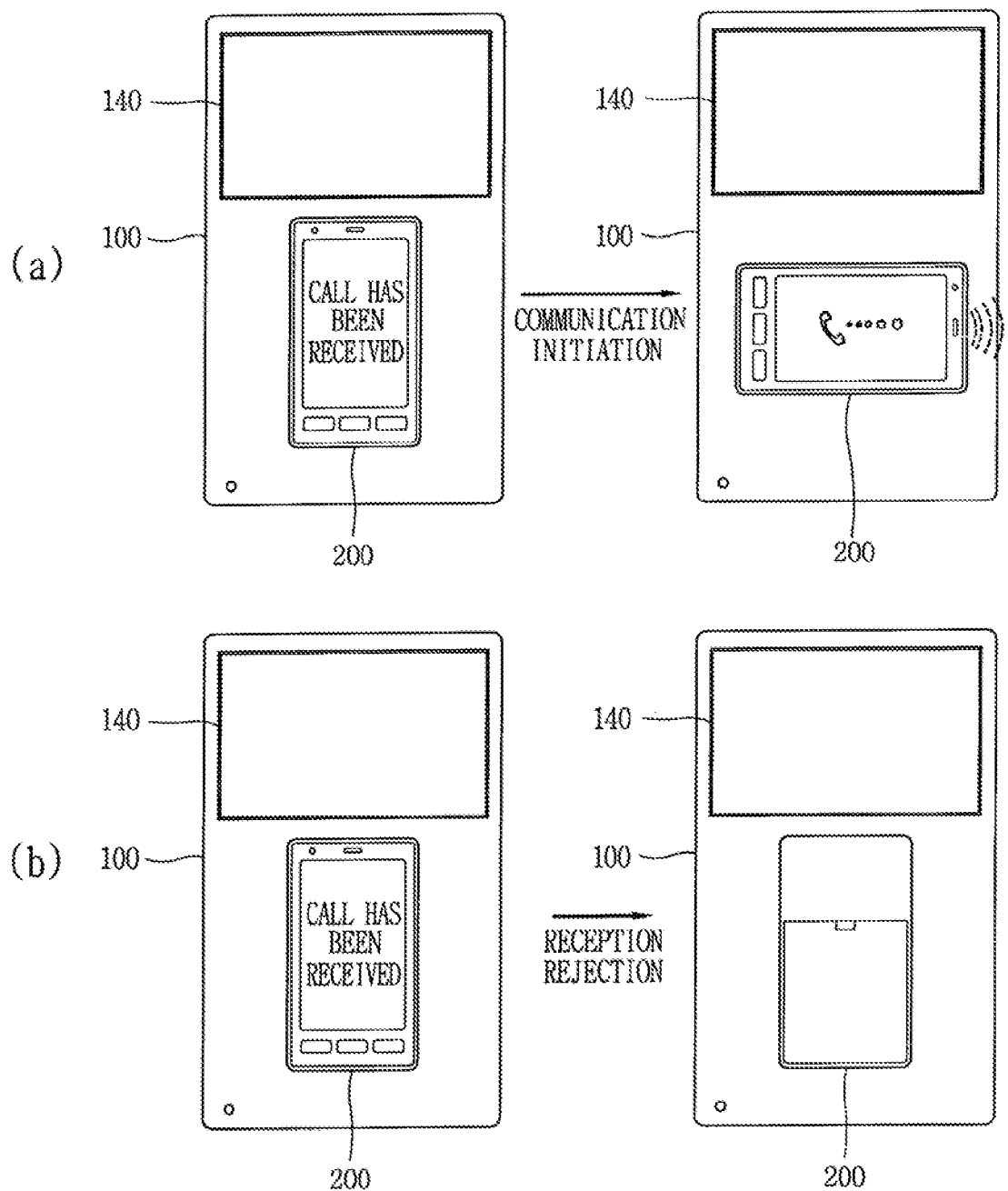
FIGS. 9(a) and 9(b) are exemplary views illustrating a state in which a configuration is changed based on the orientation of the terminal according to a fourth embodiment of the present disclosure.

FIG. 9—Fourth Embodiment

FIG. 9 is an exemplary view illustrating a state in which a configuration is changed based on the orientation of the terminal according to a fourth embodiment of the present disclosure.

FIG. 9(*a*) is a view illustrating a state in which a call signal is received based on a change in orientation of the terminal. FIG. 9(*b*) is a view illustrating a state in which a received call is handled based on a change in orientation of the terminal.

Referring to FIG. 9(*a*), in case where a call is received to the mobile communication module 212 of the terminal 200 while the power receiving unit 291 of the terminal 200 receives power by wireless, if the orientation of the terminal 200 is changed, the control unit 280 controls the terminal 200 to receive the received call and initiate communication.

Although it has been illustrated in FIG. 9(*a*) that when the direction of the main body of the terminal 200 is changed into a lateral direction in the state in which the call is received to the terminal 200, the control unit 280 controls the terminal 200 to receive the received call, this is not particularly to the orientation of the terminal 200 performing such a control.

When the communication is initiated due to the reception of the call received to the terminal 200 during the charging of the terminal 200, the control unit 280 may change a configuration so that a sound signal of the call is output to a speaker. This may be configured as a speaker phone function in the terminal 200. In this case, the sound signal output through the speaker may be output through the output unit 140 of the wireless power transmitter 100. Specifically, the sound signal of the call received to the terminal 200 is transmitted to the communication unit 130 of the wireless power transmitter 100 through the short range communication module 214 of the terminal 200 and then outputted through the output unit 140 of the wireless power transmitter 100. According to the embodiment, it is possible to maintain communication using the speaker and microphone provided to the terminal 200 or the wireless power transmitter 100 without separating the terminal 200 being charged from the wireless power transmitter 100.

Referring to FIG. 9(*b*), if the orientation of the terminal 200 is changed in the state in which a call is received to the mobile communication module 212 of the terminal 200, the control unit 280 may control the terminal 200 to receive the call and transmit voice data to another terminal, or may control the terminal 200 not to receive but to character data to another terminal receiving the call. This may be operated in a communication initiation mode or reception rejection mode of the call.

Although it has been illustrated in FIG. 9(b) that when the orientation in which the display unit 251 of the terminal 200 contacts the wireless power transmitter 100 is changed in the state in which the call is received to the terminal 200, the reception rejection function of the terminal 200 is activated in case where the surface viewing the interface surface of the wireless power transmitter 100 is the top side of the main terminal of the terminal 200, this is not limited to the orientation of the terminal 200 performing such a control.

Figure 10:
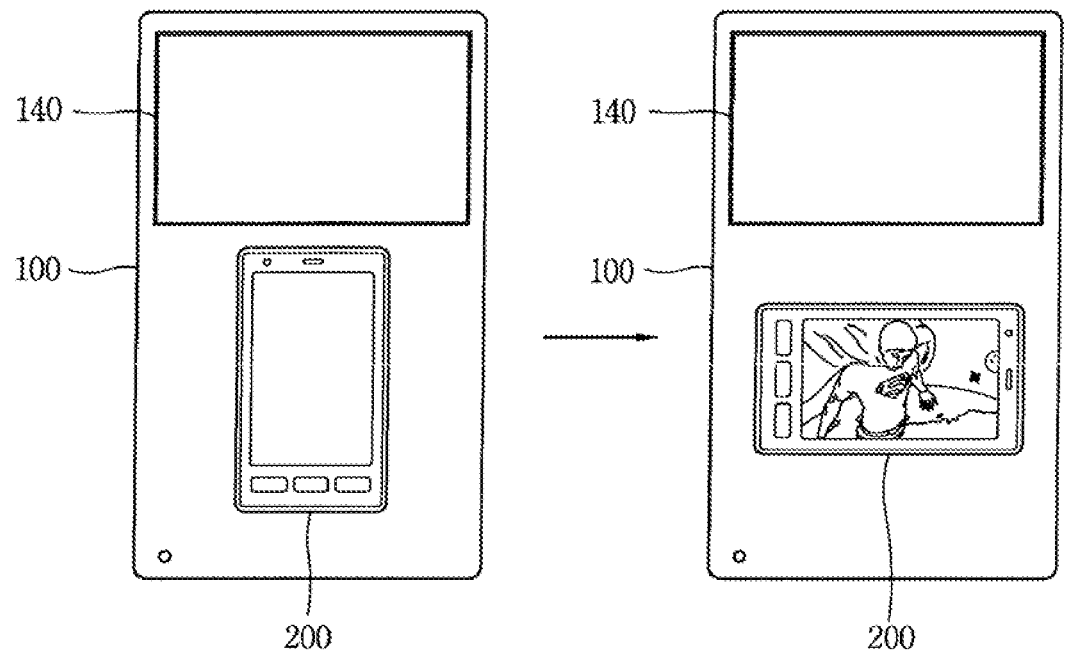
FIG. 10 is an exemplary view illustrating a state in which a configuration is changed based on the orientation of the terminal according to a fifth embodiment of the present disclosure.

FIG. 10—Fifth Embodiment

FIG. 10 is an exemplary view illustrating a state in which a configuration is changed based on the orientation of the terminal according to a fifth embodiment of the present disclosure.

Referring to FIG. 10, when the orientation of the terminal 200 is changed, the control unit 280 of the terminal 200 may execute a predetermined program. In this case, the executed program may include various applications including multimedia reproduction, which are embedded in the terminal 200.

When the predetermined program is the multimedia reproduction, the control unit 280 may control the terminal 200 to reproduce multimedia information. The multimedia information may include moving picture, music and DMB information stored in the memory 260 of the terminal 200.

If the orientation of the terminal 200 is changed in case where the predetermined program is the multimedia reproduction, the terminal 200 may reproduce the multimedia information through the output unit 140 of the wireless power transmitter 100. Specifically, the short range communication module 214 of the terminal 200 may transmit data containing the multimedia information to the communication unit 130 of the wireless power transmitter 100 so that the multimedia information is reproduced through the output unit 140 of the wireless power transmitter 100. In this case, an event may occur not only when a change in the orientation of the terminal 200 being charged is detected but also when the charging of the terminal 200 is initiated by allowing the terminal 200 reproducing the multimedia information to contact the wireless power transmitter 100 in the state in which the orientation of the terminal 200 is change and simultaneously, the wireless power transmitter 100 detects the changing of the terminal and outputs the multimedia information through the output unit 140.

Figure 11:
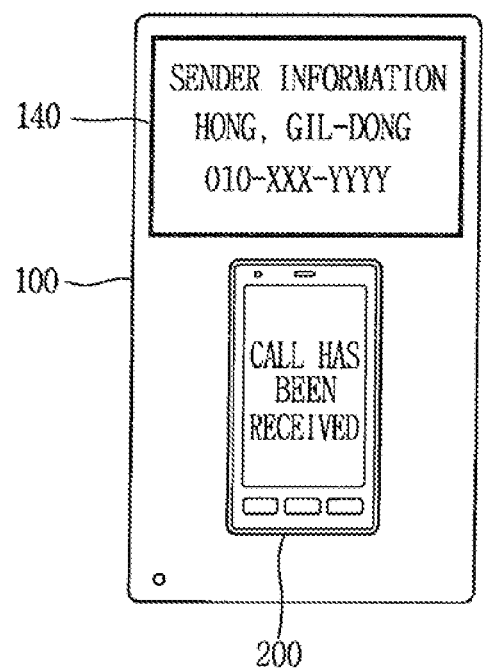
FIG. 11 is an exemplary view illustrating a state in which a configuration is changed based on the orientation of the terminal according to a sixth embodiment of the present disclosure.

FIG. 11—Sixth Embodiment

FIG. 11 is an exemplary view illustrating a state in which a configuration is changed based on the orientation of the terminal according to a sixth embodiment of the present disclosure.

Referring to FIG. 11, the wireless power transmitter 100 may display information of a call received to the terminal 200 through the output unit 140. Specifically, when the call is received to the mobile communication module 212, the terminal 200 transmits sender information of the received call to the communication unit 130 of the wireless power transmitter 100 so that the sender information is displayed through the output unit 140 of the wireless power transmitter 100.

The sender information of the call may include a sender's name, a sender's call number, a sender's image data stored in the terminal 200, etc.

The control unit 180 may control the information of the call transmitted through the communication unit 130 to be output through the output unit 140 provided to the wireless power transmitter 100. The information of the call may be visually or auditorily output, and is not limited to its form.

Alternatively, referring to FIG. 11, when the received call is received to the terminal 200 during the charging of the terminal 200 according to the embodiment of FIG. 10 so that communication is initiated, the terminal 200 transmits visual or auditory information of the communication initiated through the wireless communication module 214 through the communication unit 130 of the wireless power transmitter 100. The visual or auditory information refers to information transmitted through the mobile communication module 212 through a base station so that voice or video communication between terminals 200 is possible.

The visual or auditory information of the transmitted call may be output through the output unit 140 of the wireless power transmitter 100.

The scope of the present invention is not limited to the embodiments disclosed in this specification, and it will be understood by those skilled in the art that various changes and modifications can be made thereto within the technical spirit and scope defined by the appended claims.

What is claimed:

1. A wireless power transmitter for transmitting power by wireless to a terminal, comprising:
   a power conversion unit configured to form a wireless power signal for wireless power transfer using power supplied from a power supply unit; and
   a power transmission control unit configured to regulate a characteristic of the supplied power by selecting one of inductive coupling or electromagnetic resonance coupling, based on orientation information of the terminal,
   wherein the orientation information includes a change of the orientation information based on a relative direction of the terminal with respect to a reference location.

2. The wireless power transmitter of claim 1, wherein the characteristic of the supplied power is regulated so that a power transmission speed is increased, and
   wherein the power transmission speed is changed from general charging to rapid charging, by controlling functions being executed on the terminal to enter into a dormant state when an orientation of the terminal is not changed to be crossed.

3. The wireless power transmitter of claim 1, wherein the one of the inductive coupling or the electromagnetic resonance coupling is selected, based on a distance between the wireless power transmitter and the terminal.

4. The wireless power transmitter of claim 1, wherein the power transmission control unit detects an orientation of the terminal, based on a change in the power for forming the wireless power signal.

5. The wireless power transmitter of claim 1, further comprising a communication unit configured to perform data communication with the terminal,
   wherein the power transmission control unit receives the orientation information through the communication unit.

6. A terminal comprising:
   a power receiving unit configured to receive a wireless power signal formed by a wireless power transmitter in a wireless power transmission method; and a control unit configured to detect whether or not an orientation of the terminal is changed, and transmit a control message for power regulation to the wireless power transmitter when the orientation of the terminal is detected, wherein the wireless power signal is received in the wireless power transmission method selected among inductive coupling or electromagnetic resonance coupling, based on orientation information of the terminal, and wherein the control unit is further configured to detect whether or not the orientation of the terminal is changed based on a relative direction of the terminal with respect to a reference location.

7. The terminal of claim 6, wherein the wireless power signal is received in the wireless power transmission method selected among the inductive coupling or the electromagnetic resonance coupling, based on a distance between the wireless power transmitter and the terminal.

8. The terminal of claim 6, wherein the control message for power regulation is a message that requests the wireless power transmitter to convert the power transmission method.

9. The terminal of claim 6, wherein the control message for power regulation is a message that requests the wireless power transmitter to change the power transmission speed of the wireless power signal.

10. The terminal of claim 6, wherein the control unit determines the power transmission speed, based on the changed orientation of the terminal, and changes a power transmission speed from general charging to rapid charging, by controlling functions being executed on the terminal to enter into a dormant state when an orientation of the terminal is not changed to be crossed.

11. The terminal of claim 6, wherein when the change of the orientation of the terminal is detected, the control unit controls the terminal to output information on the transmitted power.

12. The terminal of claim 6, wherein when the change in the orientation of the terminal is detected, and a strength of the wireless power signal is smaller than a threshold value, the control unit visually or auditorily notifies that the orientation of the terminal has been changed.

13. The terminal of claim 6, wherein when the change in the orientation of the terminal is detected, the control unit executes a predetermined program.

14. The terminal of claim 6, wherein when the change in the orientation of the terminal is detected, the control unit changes a configuration, based on the changed orientation of the terminal.

15. The terminal of claim 14, wherein the orientation of the terminal represents a direction of the terminal placed on an interface surface of the wireless power transmitter, and the direction of the terminal is determined based on whether the direction of the terminal is a relative direction of a main body of the terminal with respect to the reference location on the interface surface or a direction in which the main body of the terminal views the interface surface.

16. The terminal of claim 15, wherein the control unit detects the change in the orientation of the terminal by detecting whether the direction of the main body of the terminal is changed between portrait and landscape directions or whether a surface viewing the interface surface is changed between top and bottom sides of the main body of the terminal.

17. The terminal of claim 14, wherein when the change in the orientation of the terminal is detected, the control unit changes the configuration so that a sound signal is output to a speaker.

18. The terminal of claim 14, wherein when the change in the orientation of the terminal is detected during receiving of a call signal, the control unit receives the call signal and changes the configuration so that a sound signal is output to a speaker.

19. The terminal of claim 14, wherein when the change in the orientation of the terminal is detected during receiving of a call signal, the control unit receives the call and transmits voice data to another terminal receiving the call, or does not receive the call but transmits text data to another terminal receiving the call.

20. A method of transmitting power in wireless manner to a terminal, the method comprising:
selecting a wireless power transmission method including inductive coupling or electromagnetic resonance coupling, based on orientation information of the terminal; and
forming a wireless power signal for wireless power transfer in the selected wireless power transmission method using power supplied from a power supply unit,
wherein the orientation information includes a change of the orientation information based on a relative direction of the terminal with respect to a reference location.

21. A method of a terminal, comprising:
detecting an orientation of the terminal; and
transmitting a control message for power regulation to the wireless power transmitter when the orientation of the terminal is detected,
wherein the wireless power signal is received in the wireless power transmission method selected among inductive coupling or electromagnetic resonance coupling, based on the orientation information of the terminal, and
wherein the orientation information includes a change of the orientation information based on a relative direction of the terminal with respect to a reference location.

* * * * *